United States Patent
Taylor

(10) Patent No.: US 7,533,246 B2
(45) Date of Patent: May 12, 2009

(54) APPLICATION PROGRAM EXECUTION ENHANCING INSTRUCTION SET GENERATION FOR COPROCESSOR AND CODE CONVERSION WITH MARKING FOR FUNCTION CALL TRANSLATION

(75) Inventor: Richard Michael Taylor, Midlothian (GB)

(73) Assignee: Critical Blue Ltd., Edinburgh (GB)

( * ) Notice: Subject to any disclaimer, the term of this patent is extended or adjusted under 35 U.S.C. 154(b) by 210 days.

(21) Appl. No.: 10/518,558

(22) PCT Filed: Jun. 30, 2003

(86) PCT No.: PCT/GB03/02778

§ 371 (c)(1),
(2), (4) Date: Dec. 22, 2004

(87) PCT Pub. No.: WO2004/003730

PCT Pub. Date: Jan. 8, 2004

(65) Prior Publication Data

US 2005/0216701 A1    Sep. 29, 2005

(30) Foreign Application Priority Data

Jun. 28, 2002    (GB) .................................. 0215033.2

(51) Int. Cl.
*G06F 9/44* (2006.01)
(52) U.S. Cl. ........................... 712/34; 712/36; 712/200; 717/136
(58) Field of Classification Search ....................... None
See application file for complete search history.

(56) References Cited

U.S. PATENT DOCUMENTS

| 5,819,067 | A | 10/1998 | Lynch | 703/22 |
| 6,031,992 | A | 2/2000 | Cmelik et al. | 717/138 |
| 6,298,434 | B1 | 10/2001 | Lindwer | 712/209 |
| 6,308,255 | B1 | 10/2001 | Gorishek et al. | 712/209 |
| 6,457,173 | B1 * | 9/2002 | Gupta et al. | 717/149 |
| 6,477,683 | B1 * | 11/2002 | Killian et al. | 716/1 |
| 6,634,017 | B2 * | 10/2003 | Matsui et al. | 716/11 |
| 6,701,515 | B1 * | 3/2004 | Wilson et al. | 717/117 |
| 7,036,106 | B1 * | 4/2006 | Wang et al. | 716/18 |
| 7,200,735 | B2 * | 4/2007 | Wang et al. | 712/33 |
| 2002/0013892 | A1 | 1/2002 | Gorishek et al. | 712/227 |

(Continued)

FOREIGN PATENT DOCUMENTS

EP    0 945 788 A2    9/1999

(Continued)

OTHER PUBLICATIONS

"PipeRench Implementation of the Instruction Path Coprocessor"; Chou; Pillai; Schmit; Shen Department of Electrical and Computer Engineering—Carnegie Mellon University Pittsburgh, PA 15213; pp. 1-12.

*Primary Examiner*—Kenneth S Kim
(74) *Attorney, Agent, or Firm*—Saul Ewing LLP

(57) ABSTRACT

A method for automatically configuring a microprocessor architecture so that it is able to efficiently exploit instruction level parallelism in a particular application. Executable code for another microprocessor type is translated into the specialized instruction set of the configured microprocessor. The configured microprocessor may then be used as a coprocessor in a system containing another microprocessor running the original executable code.

39 Claims, 6 Drawing Sheets

U.S. PATENT DOCUMENTS

2003/0204819 A1 * 10/2003 Matsumoto et al. ............ 716/1

FOREIGN PATENT DOCUMENTS

| GB | 2 350 216 | 11/2000 |
|---|---|---|
| GB | 2 366 426 | 3/2002 |
| WO | WO 9406077 | 3/1994 |
| WO | WO 03/044977 | 5/2003 |

* cited by examiner

```
unsigned count_bits(unsigned x) {
  int i, count;

count = 0;
  for (i = 0; i < 32; i++) {
    if (x & (1 << i)) count++;
  }
  return count;
}
```
201

```
function() {
  ...
  count = count_bits(sample);
  ...
}
```
202

APPLICATION PROGRAM EXECUTION ENHANCING INSTRUCTION SET GENERATION FOR COPROCESSOR AND CODE CONVERSION WITH MARKING FOR FUNCTION CALL TRANSLATION

CROSS REFERENCE TO RELATED APPLICATIONS

This application claims the priority of PCT/GB03/002778 filed Jun. 30, 2003 and British Application GB 0215033.2 filed on Jun. 28, 2002, the contents of which are hereby incorporated by reference.

TECHNICAL FIELD

The present invention is in the field of digital computing systems. In particular, it relates to the automatic configuration of a microprocessor architecture.

BACKGROUND ART

For a new processor Instruction Set Architecture (ISA) to be successful high quality development tools and a wide range of application supporting that ISA is required. Compilers must be made available that target the architecture along with the associated libraries and linker. A debugger is required to allow programs to be debugged while running on the architecture. Modern debuggers need to support symbolic level operation so that code can be executed with a view of the original source code. Software engineers expect an integrated development environment that ties the compiler and debugger tools into powerful GUI based environment. If software engineers cannot work in a familiar software environment then this represents a significant barrier to the adoption of a new architecture. The development of such an environment and associated tools represents many man years of development work even if existing compilers and tools can be retargeted to the new architecture.

Software developed in high level languages can be recompiled for execution on a new ISA. However, in practice, this can require significant effort. Moreover certain types of application software such as Operating Systems have strong architectural dependencies which make porting to a new ISA much more difficult.

There has been a general trend within the microprocessor industry to develop new generations of faster microprocessors that are backwardly compatible with existing ISAs. This significantly eases the adoption of new product generations. However, supporting an existing ISA in a new architecture creates significant hardware overhead especially if the intention is to extract significant parallelism from code. This overhead is particularly significant for microprocessors used within embedded systems where cost is highly significant.

It is advantageous to be able to support an existing ISA on a new microprocessor without hardware overhead. This can be achieved using instruction set translation. The ISA of a host microprocessor is converted into the ISA of a particular target microprocessor. There is a significant body of prior art in the area of instruction set translation. A number of academic and commercial systems have been built that allow binaries written for one architecture to be executed on another. One significant challenge is achieving high enough performance on the target architecture. The precise emulation of the idiosyncrasies of an architecture on another significantly degrades performance.

The simplest method is interpretive emulation. A soft CPU is built on the target architecture that is able to read and interpretively executes the instructions from the host architecture. Unfortunately this method is very slow and inefficient and is largely impractical for use in embedded systems. Moreover, this method does not allow the translated code to make effective use of the particular architectural features of the target.

The majority of recent research and commercialization in this field has been in the area of dynamic translation techniques. This method allows a very exact emulation of an architecture to be achieved while maintaining high performance levels. As code from the host architecture is encountered it is converted, at run time, into code for the target architecture using a dynamic code translator. The translated code can then be stored in a cache. The translated code can then be executed to produce the required results. If the same block of code needs to be executed then the translated version from the cache can be used again without the need to translate it again. In some systems an increasing amount of time is devoted to performing optimisations on a particular code sequence in the cache if it is frequently executed. Thus the run time system can target computationally expensive optimisations on frequently executed code. Dynamic translation systems can provide very exact emulations of architectures, even for events that are normally very difficult to handle in translation. For instance, self modifying code can be handled simply by flushing any affected code from the cache. Instructions that generate exceptions (such as memory accesses that generate a page miss) can also be handled and produce a machine state identical to that of the host architecture. Breakpoints can be handled as exceptions so that if a breakpoint is encountered execution can be made to stop at a particular host instruction. Single stepping is achieved by producing translated code blocks consisting of a single host instruction. An example of a commercially available dynamic translation system is that provided by Transmeta Inc. They have designed a soft x86 processor that actually runs on a VLIW architecture, by utilisation of dynamic translation techniques. More recently Transitive Technologies have announced a more general technology that allows dynamic translation between a number of different embedded processor architectures.

Dynamic translation is less suitable for embedded computing environments. Firstly, there is a significant memory overhead created by the translator itself and the size of the cache required in order to achieve good performance. Secondly, dynamic translation systems do not provide sufficiently deterministic behaviour. Determinism is especially important for embedded real time environments. There is a significant start up delay while code from the application is translated into the cache. There may also be significant delays if an important block of code becomes evicted from the cache.

There is also benefit to the end user being able to extend the ISA of a particular processor. This enables fast custom hardware for a particular application domain to be directly accessible from software. Some existing configurable RISC processors (such as those supplied by Tensilica Inc and Arc Cores) have a facility to extend the instruction set. A number of unused operation codes are made available and are used to select an added instruction. The instruction execution logic has to be integrated into the pipeline of the processor in order to receive operands and write results back into the register file. This integration is more automatic in the case of the Tensilica solution. Both the Tensilica and Arc processors have their own instruction set and tool chain. The tools can be updated so that the new instruction can be accessed through the compiler and assembler using a user specified mnemonic.

SUMMARY OF INVENTION

This document discloses a process for automatically configuring a microprocessor using an existing ISA. These microprocessors are targeted at embedded systems applications that execute repetitive code that contains high degrees of potential parallelism. The microprocessors are configured and programmed automatically by the analysis of the application software in the form of an executable image in the ISA of a particular host microprocessor. The configured microprocessors have a customised target ISA that is specifically designed to exploit parallelism in the application software.

The instruction set translation operates by converting each source machine instruction into a sequence of more basic operations to be executed on a target processor. All registers reads and writes are formed into separate operations. Thus a 3-address add operation is converted into operations to read the left and right operand registers, the add operation itself and finally an operation to write back the result to the register file. Instructions with complicated addressing modes or that modify the condition codes result in longer sequences of basic operations.

One disadvantage of prior art static translation systems is that they are unable to support debugging using the host instruction set. It is obviously imperative to support existing debuggers. The innovations in the translation approach are primarily in the methods to allow such debug support. By maintaining a correspondence between the host processor state and the coprocessor state at specified points in the execution it is possible to support host level breakpoints on the architecture. In other words a breakpoint can be set specified by a host instruction address and the architectural state reproduced as though the code was actually running on the host processor.

Instruction set extension is supported by converting calls to particular software functions into an invocation of an extension hardware unit. A hardware unit is designed that performs the same operation as a particular software function. That is, it takes the same parameters and produces the same results as the code in its software equivalent. The advantage of the hardware version is that it will be able to produce the results more quickly.

The configured target microprocessors may be used as coprocessors within a system. They are responsible for executing certain software functions translated from an executable image of another host microprocessor. This host microprocessor will typically also be present in the system. Mechanisms are provided to allow the host microprocessor and target coprocessors to interact and maintain coherence between the memory systems.

DESCRIPTION OF PRESENTLY PREFERRED EMBODIMENT

Processor Synthesis Flow

The retargeting of existing compilers and debuggers for the preferred embodiment of an automatically configured target processor is particularly problematic, as it has no fixed instruction set. The processor of the preferred embodiment does not support any kind of assembly language. Existing compiler and debug tools are designed to be targeted at a fixed architecture and require extensive modification to cope with a variable architecture. A fixed intermediate representation is needed to hide the variability of the architecture from existing software tools.

A particular tool trajectory has been chosen for the preferred embodiment to minimise the amount of development effort and to promote adoption of the processor. The trajectory uses existing, and therefore familiar, software development tools. The fixed intermediate representation is in fact the machine code for an existing processor. Thus all the compiler tools and debug tools for that particular architecture can be used. The code generator takes an executable for the processor as an input and produces an executable for a customized processor as the output.

The translation must be able to take code generated for a host architecture and produce code for a particular processor. This code must faithfully reproduce the same results as the original code. However, the focus of the preferred embodiment is to provide superior performance on particularly key parts of application. This superior performance is obtained through the exploitation of higher levels of parallelism. Thus the clock frequency of the system could be lowered to achieve the same level of performance and thus reduce power consumption. Even though this application code is expressed in sequential machine code the code generator must be able to reorder and schedule the individual operations as required to make effective use of the innovative architectural features supported by the preferred embodiment. Thus individual operations may be scheduled in a completely different order to that of the origin sequential code.

The preferred embodiment consists of a number of individual tools that will be used by engineers. The overall design chain is subdivided into these tools to provide greater flexibility and improve interoperability with systems supplied by other Electronic Design Automation (EDA) software vendors.

Figure 6:
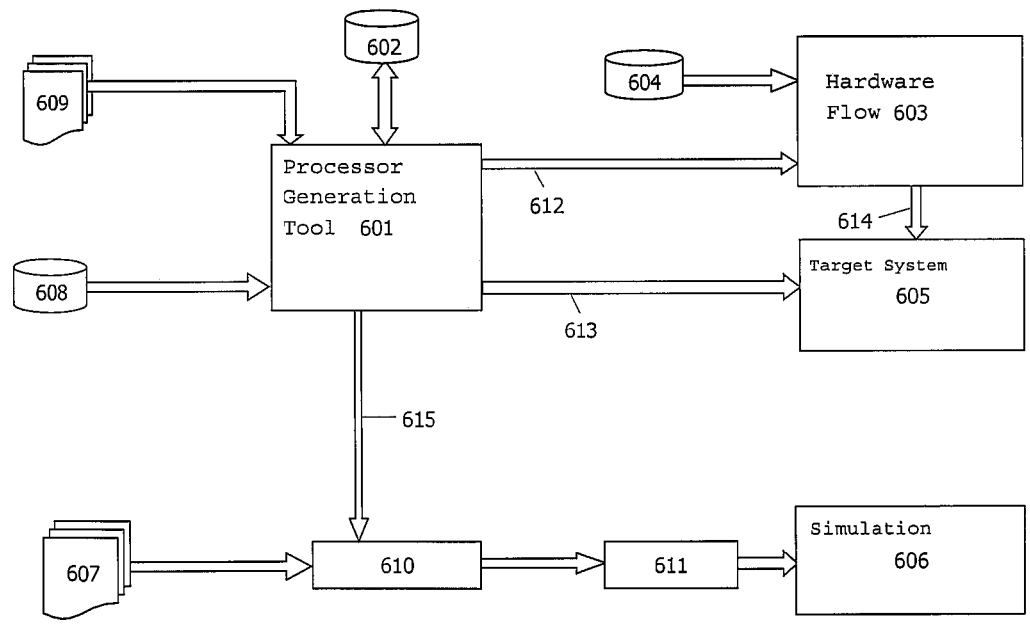
FIG. 6 provides an overview of the design flow used with the tool.

The overall tool chain and relationships between the tools is shown in FIG. 6. The box 601 represents the processor generation tool. This takes as input executable code for a host processor 608 and various configuration files 609. Alternatively the tool 601 may provide a graphical user interface allowing direct control of configuration parameters from within the tool. The tool reads and writes descriptions 602 of candidate processor architectures. In one possible flow through the tool a hardware description of a processor may be generated 612. This enters a standard hardware synthesis and place and route flow 603. In addition to the top level hardware description produced by the tool this may also incorporate library hardware elements 604. The output of the flow 603 is hardware 614 that can be used to construct a target system 605.

In another possible flow the tool 601 may generate microcode 613 for a processor that has been previously generated. The architecture of the processor will be stored in an architecture description 602.

Alternatively, the tool may be used to generate cycle accurate models of the hardware 615. Advantageously, these may be generated before hardware generation 612 to allow accurate simulation of a processor architecture before committing the design to the hardware flow 603. The models may be generated as native code that may be run on a host machine. The code may be compiled using the compiler 610 along with software models 607 of the hardware blocks 604. The resulting software may be linked using a linker 611 to produce a simulation 606. This simulation may also be linked with other models to provide a complete system level model if required.

Instruction Set Extension

The purpose of the software/hardware interface is to allow engineers to specify the boundary between hardware and software in a system. Software languages do not normally have to provide any facility for specifying that boundary. It is an intrinsic assumption that the underlying processor hardware will support a set of basic operations (such as addition, memory access etc.) that makes implementation of the software possible. All software is converted into a sequence of such operations by a compiler.

The preferred embodiment also has intrinsic hardware support for such operations. The support covers the hardware units required for implementation of all the instructions for the processor machine code used as input to the tools. However, the hardware units in the processor may be extended as required to implement more specialised functions for particular operations. Effectively, the processor of the preferred embodiment has a completely extensible instruction set.

Any particular software function may be annotated to indicate that it is actually implemented in hardware. Software functions are used as an abstraction for an operation actually implemented in hardware. Such functions must not have any side effects, such as the alteration of global variables or other areas of memory, since such operations cannot have a direct implementation in a hardware unit. Each function takes a number of parameters and produces one or more results based directly on those input parameters.

Calls to certain functions can be replaced with uses of user specified block of hardware. The engineer adds the function to a list of functions that are implemented in hardware. The hardware function is given the same name as the equivalent software function. During translation, whenever a call to the software function is encountered it is converted into an invocation of the hardware unit. The parameters that would be passed to the software function are passed as the operands to the hardware unit. The results that would have been returned by the software function are obtained as the results from the hardware unit. In this way the effective instruction set of the preferred embodiment processor can be extended as required. The hardware functions can be accessed directly from a high level language just by calling the appropriate function. Moreover, this can be achieved without having to modify or extend the fixed instruction set of the host architecture.

Figures 1, 2:
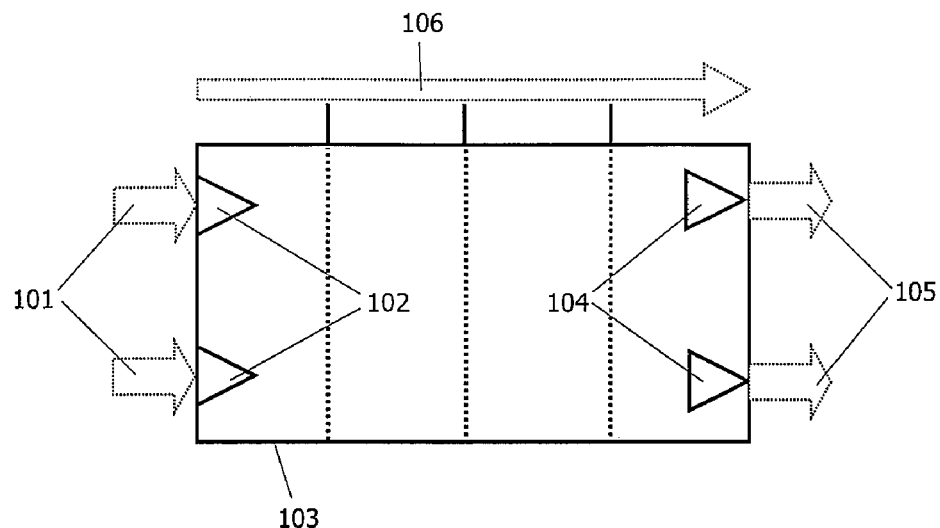
FIG. 1 provides an illustration of a functional unit with a number of cycles latency between the consumption of input operands and the generation of an output result.
FIG. 2 provides some C code which contains an example of the use of intrinsic functions.

FIG. 2 shows an example usage of the intrinsic mechanism. The example provides a hardware implementation of a bit counting function 201. This can be performed very efficiently in hardware but is much more time consuming in a software implementation. The bit count function is called in the code segment 202. If the bit counting function is marked as being intrinsic then the hardware unit will be used when code 202 is targeted through the tool.

The example illustrates the power of the methodology. Within a few lines of code the user has defined a custom instruction for a processor. There is no need to resort to assembly language or any complex definition language. What is more, the program is completely standard C/C++ and is easily readable by any programmer.

User defined hardware units do not have to be purely computational in nature. For instance, functions can be written to read and write to an array. This corresponds to an additional memory unit in the hardware of the processor. This is especially useful if extra memory units need to be defined to improve overall memory bandwidth for certain applications.

The software form of a function that is implemented in a hardware unit forms a behavioural model. That is, it describes the operation of the execution unit. The behavioural code is expected to produce exactly the same results that the real hardware would. Such code is executed during simulation. The code may access I/O or library functions that would not be present on a target system. This allows the easy capture of trace information from execution units. Particular execution units might represent I/O units in the real system. These units can generate the appropriate stimulus required for the simulation.

The actual implementation of the hardware is generated separately from the behavioural implementation. Any development methodology may be employed as long as the behavioural model and hardware implementation remain equivalent. Normally, an implementation is obtained by rewriting the software version into HDL. It can then be synthesized to generate an actual hardware implementation. Each execution unit only implements a fine grain component in the overall system so they are simple to verify.

Execution Unit Model

A single hardware execution unit may implement one or more individual functions. Each of these functions is termed a method of the unit. This corresponds to the terminology of a class encapsulation used in C++. Indeed, if C++ is used as the language to program the architecture then classes may be directly used to model a hardware unit, with the function members corresponding directly to these methods.

FIG. 1 shows the basic model of an execution unit 103. The underlying model of an execution unit is as a synchronous, pipelined unit. This fits well with the computational model of units within a processor. A unit is able to accept a number of operands 102 on a particular dock cycle and will produce result(s) 104 a number of clock cycles later. This delay is referred to as the latency of the unit and is illustrated as 106. It is expected that the unit is able to accept a new operation on every dock cycle. If necessary a blockage can be set for the unit that prevents it accepting another operation for a certain number of dock cycles after the last one. Operand data 101 is supplied from other execution units in the architecture and result data 105 are supplied to other units. The widths of operands and results are fully configurable.

Code Translation

The translation must be able to take code generated for a particular host architecture and produce code for a target processor. This code must faithfully reproduce the same results as that host machine code. However, the focus of the preferred embodiment is to provide superior performance on particularly key parts of an application.

In the translated code certain sequences of operations may be considered to be atomic. That is, the execution of the target processor will never stop part way through such a sequence. Therefore any intermediate processor state occurring during the execution of such an atomic block cannot be visible externally to the target processor. Such a sequence is hereafter referred to as an atomic block.

Register Representation

A processor of the preferred embodiment has a central register file that is used to hold values that are written to registers in the host code. There is largely a one-to-one correspondence between these registers and those present in the host architecture.

Only those register values that are live at the conclusion of an atomic block to be stored into the corresponding register. A register is live if it might be subsequently read in the program. Temporary uses of registers within an atomic block do not have to be reproduced in the register file. Thus the amount of register file traffic can be significantly reduced in comparison to the host architecture.

The main registers are directly equivalent to those present in the host architecture. The majority of RISC host architectures have either 16 or 32 registers of 32 bit width. The same number of registers are present in the target processor register file.

Typically a host processor will have a condition code register. This holds status bits generated as a result of certain arithmetic or other operations, such as carry and overflow etc. These status bits must also be preserved in a central register. Again, however, they only need to be preserved if a register is live at the end of an atomic block.

Instruction Translation

This section describes how individual instructions in the host architecture are translated into sequences of operations for execution on the target architecture. The descriptions are based on the mechanisms used for translating a typical RISC instruction set. The general techniques for translating one instruction set to another are well known in the, prior art.

Branches

The branch itself is translated into two separate operations. Firstly there is an immediate load that sets the destination address. The actual value is set when the final binary is being written and the exact address has been determined. The second operation is the branch itself. The immediate value is passed to the branch unit. This value is then passed to a branch control unit.

Hardware Function Calls

If the host code contains a call to a function marked as being implemented in hardware then the call is translated into a use of the hardware unit. The software parameters are passed as the operands of the hardware operation. There will be a direct correspondence between the software function parameters and those that must be passed to the hardware unit.

The Application Binary Interface (ABI) of the host architecture will define how parameters must be passed to a function. This information is used during the translation process so that the locations of the parameters are known. In general the first few parameters are passed in fixed registers and later parameters passed in fixed locations on the stack frame.

Code is generated to read each of the required parameters from the appropriate register. Later parameters are read from stack frame locations as required. These loaded parameters are then passed as operands to the hardware method.

If the software function provides a return result then this must be emulated from the hardware call. A function call result is normally returned in a particular fixed register. Code is generated to copy the result from the appropriate result port of the hardware unit to the register.

Some parameters may be marked as output parameters corresponding to pointers (or reference parameters) to hold results from the function. Code is generated to obtain the parameter, representing the destination address, and generate a store of the result port to the address. The wrapper code generated around the use of the hardware unit thus allows the hardware unit to provide the same behaviour as a software function implementation.

Software Function Calls

A software function call is similar to a branch operation except that a link register is set prior to the call. The link register holds the return address from the call. In the host instruction the link register may be implicitly set from the next PC value as part of the instruction operation.

In the translated version the link register is loaded with an immediate value representing the address of the instruction following the call in the original program. This is the return location and can be mapped via an address link in the translated image. The immediate value is written to the link register prior to the actual call. The call is implemented as a load of the destination address, followed by a branch operation.

Data Processing Instructions

A particular host architecture will support a number of data processing operations. For a RISC architecture these will typically use a 3-address format where a left and right operand is specified along with a destination register. Some operations (such as compares and tests) do not actually cause a write-back to a register. Addressing modes may be available to allow immediate, register or shifted values to be specified, for instance. The instructions may optionally write to the condition code register.

The individual instructions are translated into a number of separate operations on the target architecture. The sequence of operations required is dependent upon any addressing mode used. Code is first generated to load operands from the central register file. This is followed by the translated data processing operation itself. The majority of instructions map to a single data processing operation. If required then an operation is generated to write the result back to the destination register. If the instruction updates the condition codes then further operations are generated to update the affected condition code registers. Thus a sequence of operations is generated that produce the same effect as the original host instruction.

Thus a single host instruction is translated into a number of individual operations. However, in general the later code optimisation phase will be able to eliminate many of the register file accesses to allow operands to be passed directly between the functional units.

Any read of the PC register (if architecturally visible) is handled specially. Such an operation is generally used to calculate the address of a data item in a position independent manner. The full immediate value after addition is calculated and then a single operation is generated to load it via an immediate unit.

Memory Access Instructions

Typically memory access instructions may support a number of addressing modes. The code sequence generated is dependent upon the address mode used for the host instruction. This allows an address to be automatically incremented or decremented as part of the access instruction without the requirement for additional address update instructions.

These addressing modes and updates must be subdivided into their constituent operations. The memory access unit uses the final computed address as its operand. In the case of pre-indexing the address is calculated and then written back to the base register if required. This address is then used for the access. In the case of post-indexing the address is simply formed from reading the base register. The access is performed and then the full address is calculated and written back to the base register.

Block Memory Instructions

The block memory instructions allow multiple words to be loaded or stored to memory with a single host instruction. The behaviour of such an instruction is unusual in that it does not conform to the general principles of RISC instruction implementation. It takes a variable number of dock cycles to execute depending upon the number of registers that need to be stored or loaded. The multiple word access instructions are commonly used in function prologues and epilogues to save and restore volatile registers on the stack frame.

Such block memory instructions are translated into multiple operations in the target architecture. The base register is read and then for each individual access (as determined by the register list in the host instruction) a memory operation is generated. An individual addition to the base address, using an immediate offset, is generated for each access. Individual offsets are generated rather than continually incrementing/decrementing a single address value. This improves freedom to allow the memory accesses to be more easily issued in parallel with other operations.

Translated Code Storage

The static translation process occurs as a post-link operation. The intention is that this is called automatically from the host software development environment. If the software IDE does not support the calling of a post-link operation then a script can be used that incorporates both the link and the call of the processor code generation tool.

Since the tool is run after linker it operates on a complete executable. There are no unresolved references and the locations for all data sections are determined. No support is provided for any kind of dynamically linking, as such support is less important in embedded development environments.

The executable image provided to the tool should not be stripped of the function symbols for the functions that are being translated. If necessary all other symbols may be stripped from the executable image in order to save space.

The translation takes the executable image and generates a new executable image that contains the translated code. A new section is simply appended to the executable. From the perspective of the host processor this is simply a static data section. It contains all of the translated code for the target processor. Since exactly the same format is retained for the executable image, the standard tools can be used to download both the host processor and the targeted processor image to the system. Moreover, the image can be read as normal by debuggers in order to support symbolic debug.

The appended Target Code Area (TCA) is a contiguous block of memory that holds the code for the target processor. It also holds a mapping table that is used to transform host addresses into target code addresses. This mapping mechanism is required for making debug of generated processors compatible with existing host processors.

Target Code Area Base Address

The TCA has a base address within the virtual address space of the host processor. This may be explicitly set as a configuration parameter or, alternatively, an address may be selected that follows on from the end of the existing program section.

The base address is stored within a data table within the executable so that the host processor is able to store the base address into a target processor register named Target Code Base (TCB). This allows host to target address mappings to be performed.

Target Code Area Size

The size of the TCA depends on the amount of target microcode that needs to be translated for the processor. The TCA size is automatically scaled to a suitable size. The size of the TCA influences the setting of the Target Code Mask (TCM). The TCM must be a mask that causes host addresses to be mapped within the TCA. Thus the number of set bits within the TCM represents a power of 2 size which is the one just smaller than the actual size of the table. The reachable size of the TCA is made as large as possible to reduce the probability of address collisions.

Most of the words within the TCA are used to hold microcode for the processor. These words are 32 bits in width even though the actual execution word size of the processor may be wider. Individual execution words are subdivided into 32 bit words for storage within the TCA. A type tag stored within each word allows microcode and other data types to be interspersed.

Certain words within the TCA are used to hold address mappings. These are present to support the transformation of host addresses into target addresses. Such transformations are required in order to allow function returns and indirect function calls using host addresses. When used for this purpose the mapping is referred to hereafter as an Address Link. The mappings are also accessed by the debug unit when it needs to map a host breakpoint address into an equivalent target code address. Such a mapping is referred to hereafter as a Debug Link. The mappings must be placed at particular locations in the TCA, since they are part of a hash table. Thus other data types are placed around the mappings. A type tag stored within each word allows mappings and other data types to be interspersed.

Mapping Process

Figure 3:
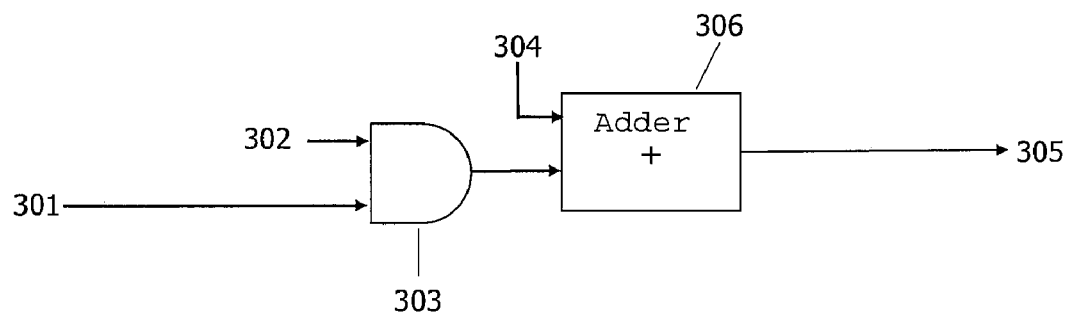
FIG. 3 provides an overview of the hardware used to transform a target offset address into a host address.

FIG. 3 illustrates the mapping process that is used to transform an input host address into an address within the Target Code Area. This is used for accessing the Address Link and Debug Link information from a host address.

Firstly, the host address 301 is masked with the Target Code Mask (TCM) 302 using the hardware 303. This masks off the address so that it is within the size range of the target area. The number of least significant bits that are set in the TCM will be dependent upon the target area size. The lower 2 bits of the TCM are always reset, as all supplied host addresses must be word aligned as all host instructions are word aligned.

The masked value is then added to the Target Code Base (TCB) 304 using the adder 306. This is a fixed base value that gives the location of the Target Code Area in the virtual address space of the host processor. It is set via a register within the Bus Interface Unit. After the addition the address 305 will be within the range of the Target Code Area.

Address Linking

The address linking mechanism allows host addresses to be used for indirect function calls and function call returns. By using the host addresses the data stored by the target processor is compatible with existing debuggers.

Function Entry Address Link

The function entry address link mechanism allows indirect calls to be made using the host addresses of functions. Indirect function calls are explicitly supported in most high level languages.

Figure 4:
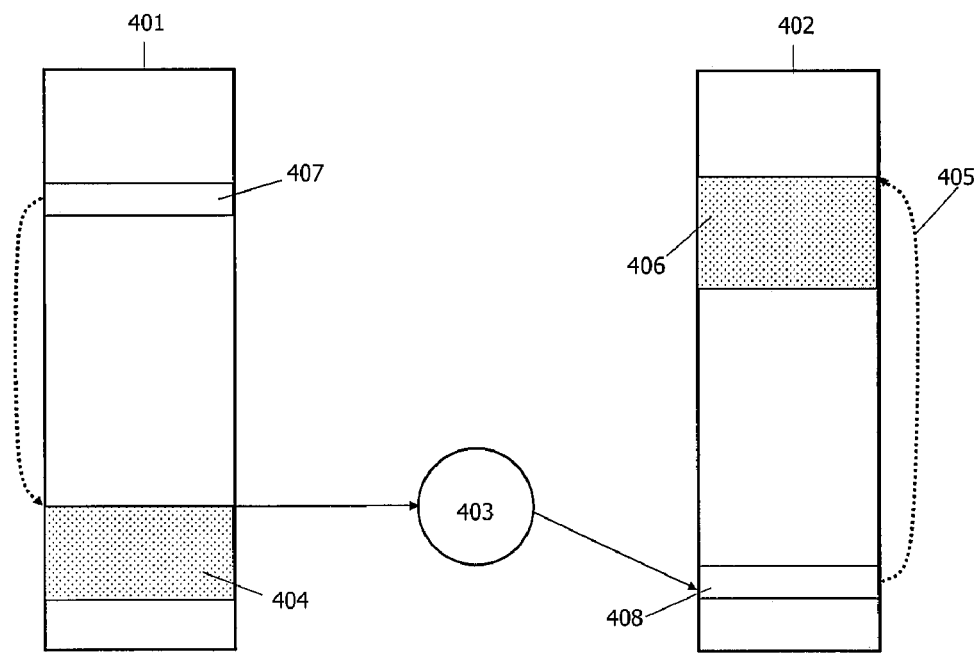
FIG. 4 provides an example of the mapping of an indirect function call on the host architecture to an indirect function call on the target.

FIG. 4 illustrates how the mechanism works. A translation must be made dynamically between the host code address space 401 and the address of microcode within the target code area 402. The host code performs an indirect function call 407 using a calculated function address. The destination function is shown as 404. For instance, this may be as a result of a virtual function call in C++ where the function pointer is obtained from the virtual function table for the object in question. In general it is not possible to determine what set of functions any given indirect call might reach. The code analysis must assume that any indirect call can reach any function anywhere in the code image.

If the function has been translated to the target processor then it will have an address link 408 associated with it. This allows indirect function calls to be made between functions on the target processor. The address link contains the address 405 of the translated form of the function 406. Whenever there is an indirect function call in the translated code a special address link operation is performed first. This performs a mapping 403 from the host function address to the target address. An indirect call can then be made to the destination pointed to by the link. Thus all indirect function calls are made doubly indirect in order to reach the translated form of the function. If the link mapping does not access a suitable address link entry then that indicates that an indirect function call is being made to a function that has not been translated.

Return Address Link

The function call address link mechanism allows a host address, which would be used in the original untranslated program, to be used in the translated version. The return address is loaded into the link register by a call instruction in the host code image and this value is architecturally visible. The link register is preserved on the stack frame if the callee function makes any further calls. The debugger reads these preserved link values in order to generate a stack trace back and show the location the calling points represented on the stack. Thus to maintain compatibility with debuggers the host link address must be used.

Figure 5:
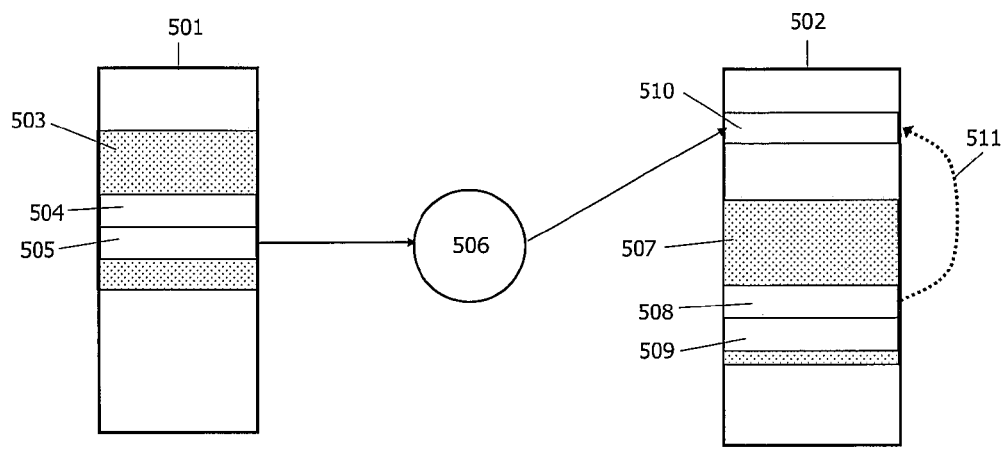
FIG. 5 provides an example of a direct function call on the host and how it is translated into a call on the target.

The return address link mechanism is illustrated in FIG. 5. In the host code address space 501 a call 504 is made. This call will load a return address for the instruction following the call 505. That is the address to which execution returns after the call. In the translated code image that return host address 505 has an address link entry 510 associated with it. The address link points to the translated form of the instructions following the original call 509. The translated version of the call 508 explicitly loads the link register with the address of the following host instruction 505, in the same manner as the original code. In the callee function (not shown), the return instruction (which is essentially an indirect branch to the link register) is converted into an address link operation followed by an indirect branch. The map address link obtains the address via the mapping 506 to obtain the content of the address link. The following indirect branch then initiates execution at 509 after the translated call site.

This mechanism allows the host return addresses to be used and thus full compatibility maintained with debuggers for the host architecture. The only cost is the requirement to explicitly load the link register with an immediate address before a call and an extra map link at the point of a function return.

Debug Linking

Debug Links are placed into the Target Code Area in order to support the debug of translated code. There is at least one debug link for each atomic block in the target code. Thus the number of debug links will generally be much greater than the number of address links in the Target Code Area. They provide a mapping from a host address to a particular execution word. That execution word represents the start address of an atomic block.

By providing debug links at atomic block granularity it is possible to provide breakpoints that are only activated if a particular path through the code is taken. Each atomic block represents a particular sequence of conditionally executed code. Only one debug link needs to be provided for each atomic block since the breakpoint can occur at the start of the atomic block and then code can be executed on the host processor to advance the execution point to the exact breakpoint. This significantly reduces the number of links that are required in the Target Code Area.

Link Collisions

Address and Debug Links are placed at locations in the Target Code Area that are determined by the least significant bits of the host address. This is a simple hash table representation that simply uses these bits as the hashing function. Given this address scheme it is possible that multiple Address or Debug Links may map to the same location in the Target Code Area. Thus a mechanism is required to handle such collisions. The Target Code Area is made as large as possible to reduce the number of collisions.

Figure 7:
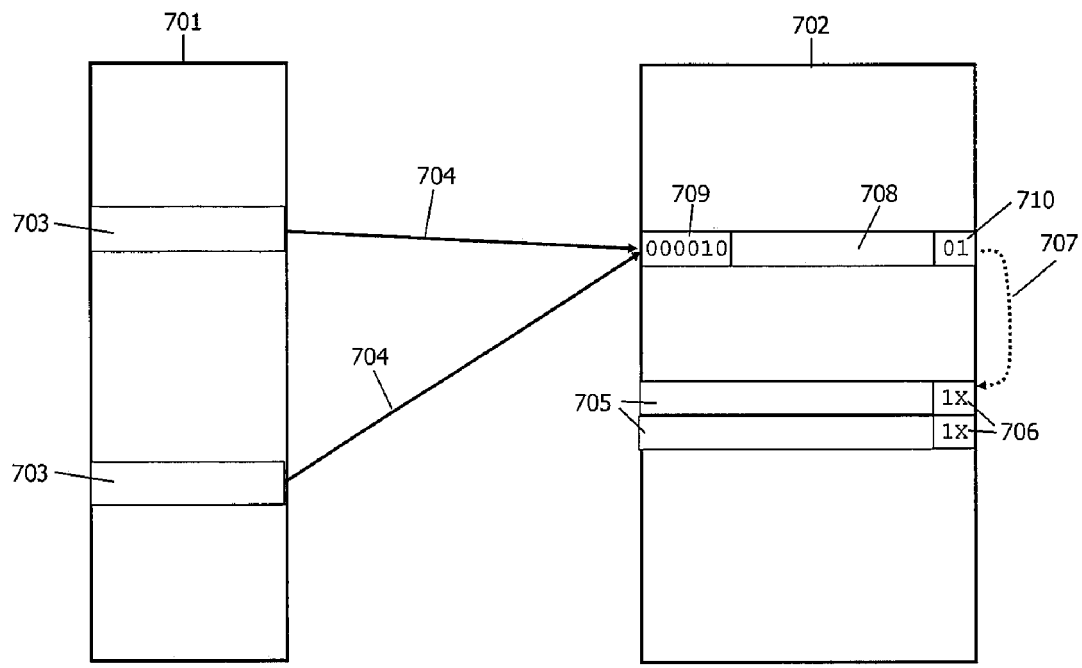
FIG. 7 illustrates how collision pointers are used to handle multiple links that map to the same address in the target code area.

A link collision example is shown in FIG. 7. The host code address space is shown 701 with the requirement for two address links associated with the instructions 703. Both of these instruction addresses map 704 to the same address link 710. These addresses map to the same location in the Target Code Area because the host addresses share all the same least significant bit values that are not masked by the TCM.

The collision is detected and a Collision Pointer 710 is placed in the Target Code Area 702. The purpose of the collision pointer is to point to another area of memory in the Target Code Area that holds all the Address or Debug Links that mapped to the same initial location. The upper bits of the Collision Pointer 709 hold a count of the total number of entries in the indirect collision sequence. The Collision Pointer as an offset address 708 to the indirect sequence of links 705 via the address 707. The indirect sequence itself consists of a number of Address or Debug Links. They are marked as Address or Debug links via their tags 706. These have a special flag bit indicating that they are obtained indirectly via the Collision Pointer. These avoids them being incorrectly used as Address or Debug Links for the locations to which they are allocated. All of the indirect Address or Debug Links are considered to be associated with the host address of the Collision Pointer. Note that the indirect sequence of links may be interspersed with direct links. The two can be differentiated by use of the flag bit.

Target Data Format (TDF)

Figure 8:
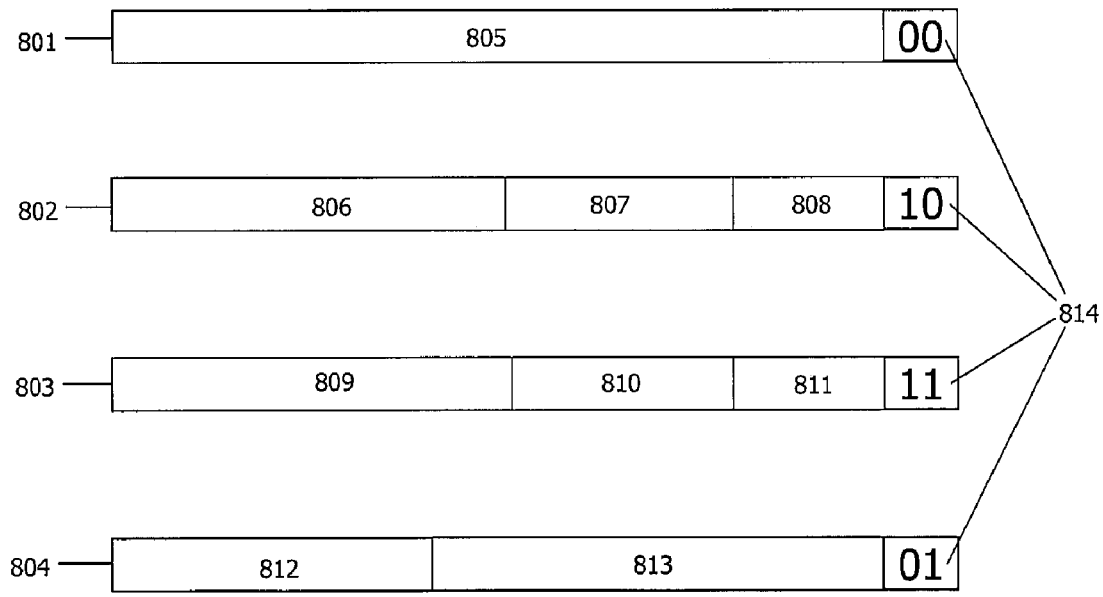
FIG. 8 provides an overview of the target data format.

This section describes the different types of data that can be represented in the Target Code Area. This is illustrated in FIG. 8 showing the possible TDF types. Each of the data types is 32 bits in size and is distinguished using a 2 bit type tag 814.

Type 801 represents a word of microcode stored in 805. Type 802 represents an address link The bits 808 provide an offset in the target code area. The number of bits allocated to 808 depends on the size of the target code area. The bits 807 provide a tag comparison against a number of the bits not used to index the location in the target code area. The bits 806 provide various control attributes of the destination code. Type 803 represents a debug link. It has a very similar format to an address link. Bits 811 provide the offset, bits 810 are for comparison and bits 809 provide control attributes.

Target Address Format (TAF)

The TAF is used as a common format for transferring destination addresses. The representation allows both host and target addresses to be specified in a single format. This is a requirement to allow host addresses to be specified when calls or branches are made to code that has not been translated. Moreover, if a host to target address translation fails then this format allows the host address to be retained. Thus an appropriate host continuation address can be generated if such a branch is taken.

Figure 12:
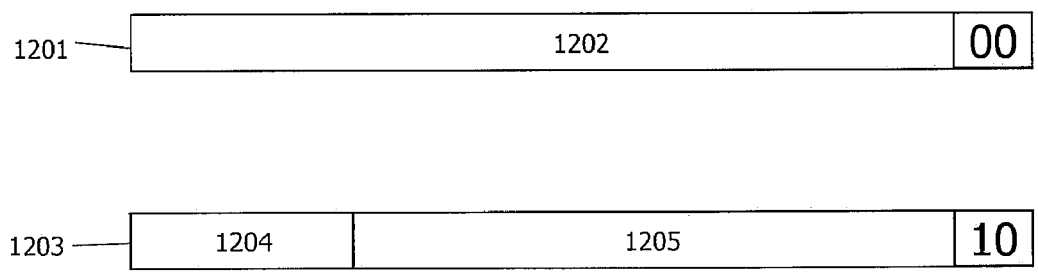
FIG. 12 provides an overview of the target address format.

The format of the TAF is shown in FIG. 12. It is designed to be a close subset of the TDF to allow simple transformation of address links obtained in TDF.

Type 1201 represents a host instruction address stored in bits 1202. The lower two bits contain the tag of 00. Thus instruction addresses must be word aligned. This is a property that is generally true for 32 bit RISC architectures. Type 1203 represents a target address. The bits 1205 given the actual address of target code to execute and bits 1204 gives the control attributes.

Debug Environment

Before an application is ever run on real hardware it will have been tested in a simulation environment. This allows full cycle and bit accurate testing. Stimulus and behavioural modelling code will be produced to emulate the physical environment that the application will be executed within. This process will allow the discovery of most major bugs in the application. Since the simulation runs natively using a C++ environment, the engineer is able to use his or her favourite debugger and integrated development environment.

Of course, there are always likely to be application level bugs that only manifest themselves in the real hardware environment. To allow easy analysis of these, the preferred embodiment supports a powerful debug environment.

Figure 10:
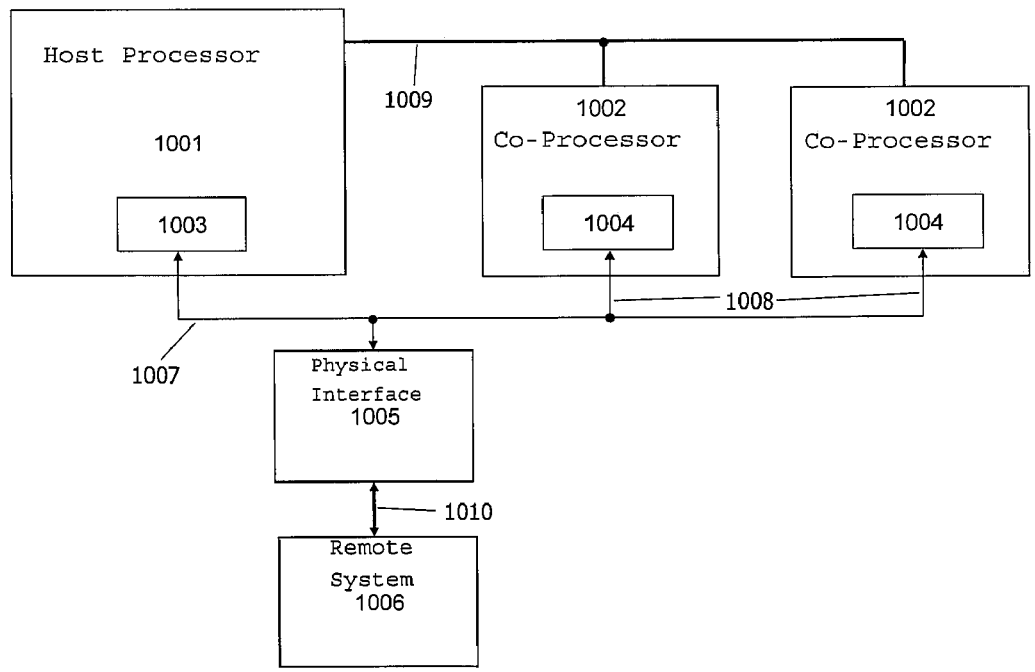
FIG. 10 provides an overview of the connectivity of a host processor and coprocessors in a system and how they are connected to a debug environment on a remote system.

The overall debug architecture is illustrated in FIG. 10. A remote system 1006 communicates with the target system via a serial or parallel link 1010. A serial link may be used since high data speeds are not required and there is a need to minimise the area that the debug hardware occupies. A remote debugging protocol is run over the link. The remote debugger can send commands to the system to set breakpoints, read/write memory and read/write registers etc. The remote debugger will be compatible with the instruction set of the host processor in the system. The physical interface 1005 links to the blocks within the system. Typically the physical interface will be compatible with JTAG.

The host processor in the system 1001 will contain a debug control unit 1003 connected to the debug channel 1007. Typically the debug control unit will contain status and breakpoint registers. Breakpoint registers allow execution to be halted at a particular instruction address. The host processor will connect to a number of coprocessors 1002 via a system bus or coprocessor interface 1009. The coprocessors are running code that has been translated from the same executable being run by the host processor. Each coprocessor will contain a debug control unit 1004. These may snoop data 1008 from the same debug channel as the host processor.

Breakpoint settings intended for the host processor can be detected by the debug control units 1004. These breakpoints will initially be specified as code addresses relating to the location of functions on the host processor 1001. The debug control units will use the address linking and debug linking mechanisms to translate those into an address in the translated code of a coprocessor. If the function is not mapped to the coprocessor then no mapping will be located and thus no breakpoint will be set.

The coprocessor contains a number of breakpoint registers in the debug unit 1004. These are set with the result of the address linking process. These cause the processor to halt if the target code position of the breakpoint is reached. Execution is halted if a particular atomic block is reached. This allows breakpoints that halt the machine on the equivalent of a particular host instruction in the code.

If the program execution were to be stopped on a breakpoint on the boundary between atomic blocks then all the important register and memory state would be the same that observed on the host architecture. Of course, breakpoints can be set on any host instruction. Reducing the size of an atomic block to a single host instruction would dramatically reduce optimisation opportunities and thus the performance of the processor.

Breakpointing on an individual host instruction is achieved as follows. A breakpoint is set by specifying a host instruction on which to halt. This is converted, using the previously described debug linking means, into the address of a particular atomic block in the translated code. A breakpoint is set on the coprocessor at the start of that particular atomic block. This atomic block will be the one immediately preceding the translation of the required host instruction.

When the breakpoint is detected the execution is continued back onto the host processor. The register and any modified memory state held on the coprocessor is sent back to the host processor. The host processor will have had exactly the same breakpoint set. Execution on the host processor will continue from the first instruction associated with the breakpointed atomic block. Execution then continues instruction-by-instruction until the precise breakpointed instruction is reached. In this manner the instruction level state at the breakpoint can be reproduced from a combination of state generated by the coprocessor and the host processor itself.

To allow high levels of parallelism in the architecture, code can be scheduled out-of-order with respect to the original sequential code. Results may be generated in a completely different order to the way they are expressed in the original sequential code. The user should not need to be aware of this. When they are debugging the code and single stepping through it they expect expressions to be evaluated and results produced in the sequential order expressed in the original sequential code.

Executable Update

In the preferred embodiment a specialised coprocessors may be generated automatically. These should interact with the host processor in the system in as seamless a manner as possible. The software application should be able to run across the combination of both the host processor and the coprocessors in the system. Certain software functions are marked for execution on a coprocessor. Whenever the function is called on the host processor the execution flow should be automatically directed to the coprocessor.

To this end the original host code executable is modified automatically in the preferred embodiment. The initial instructions in the host code for functions that are being mapped to a coprocessor are modified to load the address of the function on the coprocessor and branch to a common handling function. This handling function is responsible for communicating with the coprocessor. Certain aspects of the host processor state (such as the registers) may be transferred across to the coprocessor. The coprocessor execution is then initiated from the required address to execute the translated function. When the function execution is completed the state is transferred back to the host processor. Execution may then continue on the host processor. Advantageously, this provides the effect of a transparent offload of the function onto a coprocessor.

System Architecture

This section describes the options for the system architecture of the preferred embodiment. It is desirable to provide a shared memory environment where the coprocessors can access the same address space as the host processor. This allows pointers to be freely passed between the two environments and allows complex data structures to be shared.

Providing a shared memory environment adds hardware complexity, as caches are required within the coprocessor that must remain coherent with contents of other caches in the system.

There are two possible interaction models for the host processors and the coprocessors as detailed below:

Blocking Model

Figure 11:
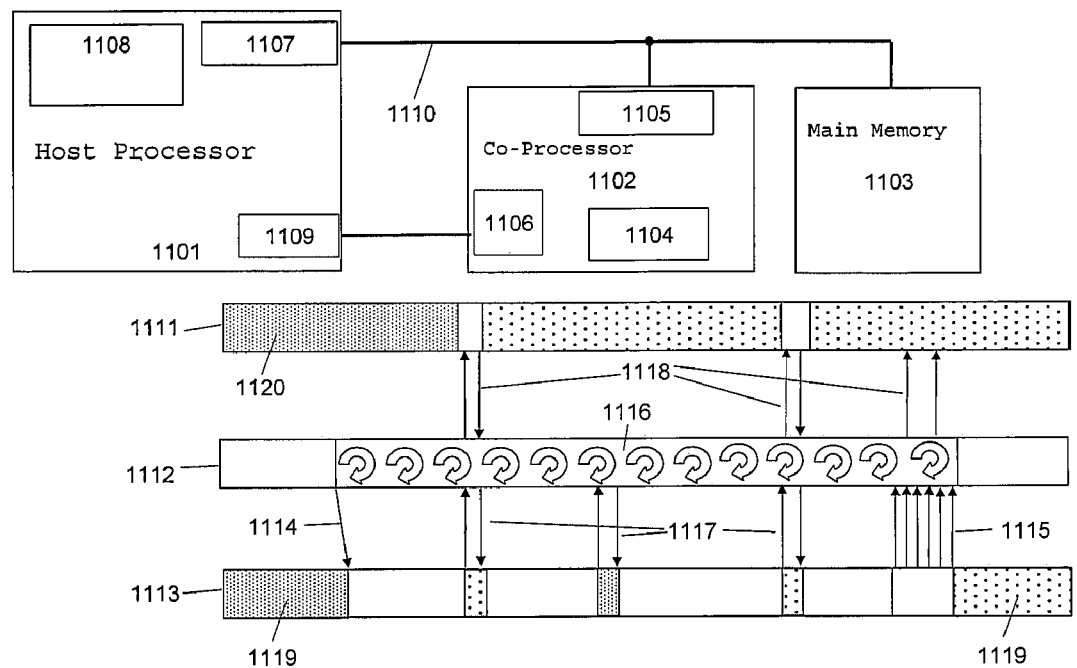
FIG. 11 shows the interactions between the host processor, coprocessor and memory in the context of the host processor being blocked while the coprocessor is active.

In the simplest configuration the host processor is blocked while the coprocessor is executing functions. An illustration of this architecture is given in FIG. 11. A host processor 1101 contains a cache 1108 and also an interface to the system bus 1107. The main memory 1103 will be connected to the processor using the system bus 1110. Optionally, the host processor may have a specialised coprocessor interface 1109. A coprocessor 1102 may be connected to the host processor either via the system bus and a bus interface unit 1105 or via an optional interface to a coprocessor port 1106.

It is expected that the host processor contains a cache 1104. For good performance such caches normally include use a write-back rather than a write-through caching mechanism. Thus data that has been updated is only written back to main memory when the cache line needs to be evicted.

The coprocessor is implemented as a slave to the host processor. Each coprocessor is allocated a block of registers in the address map of the bus. These registers can be accessed by software running on the processor. Transmission of data from the coprocessor to the host processor is performed via the host processor reading registers stored within the interface.

The coprocessors may also have the capability to generate an interrupt to the host processor in order to handle a critical event or something outside of the normal communication protocol.

In this model all memory accesses are directed via the host processor. This allows all addresses handled by the coprocessor to be virtual. Thus the cache 1104 is indexed using virtual addresses. Memory addresses supplied to the host processor are automatically translated into physical addresses using the address translation mechanisms already implemented by the host processor.

When the host processor timeline 1112 encounters a function that is being executed by the coprocessor the register state is passed to the coprocessor 1114. The coprocessor 1113 shows the execution of the functions. As soon as the initiation is received from the host processor the coprocessor leaves its sleep state 1119. While the coprocessor is running the host processor is blocked 1116 waiting for requests from the coprocessor. During its execution the coprocessor will initiate requests 1117 if there are cache misses. These requests will be handled by the host processor and those which cannot be satisfied from data in the coprocessor will result in transactions to the main memory 1118. The main memory timeline 1111 shows the memory being idle 1120 unless it receives a transaction request.

When the end of the function executed is reached any dirty data in the cache 1104 is written back 1115. The coprocessor can then re-enter its sleeping state 1119.

Non-Blocking Implementation

The non-blocking model provides a more complex interaction between the host processor and the coprocessor. In this model the host processor may continue and perform other tasks while the coprocessor is operational. This relies on the coprocessor being able to become a bus master and initiate memory accesses directly. Since the coprocessor must be able to initiate memory accesses using physical addresses it needs to be able to perform a virtual to physical address translation.

The model relies on the use of threads in the application program running on the host processor. When a particular thread encounters a function that has been mapped onto a particular coprocessor the thread effectively transfers onto the coprocessor. The host processor is therefore freed to continue running other threads.

Figure 9:
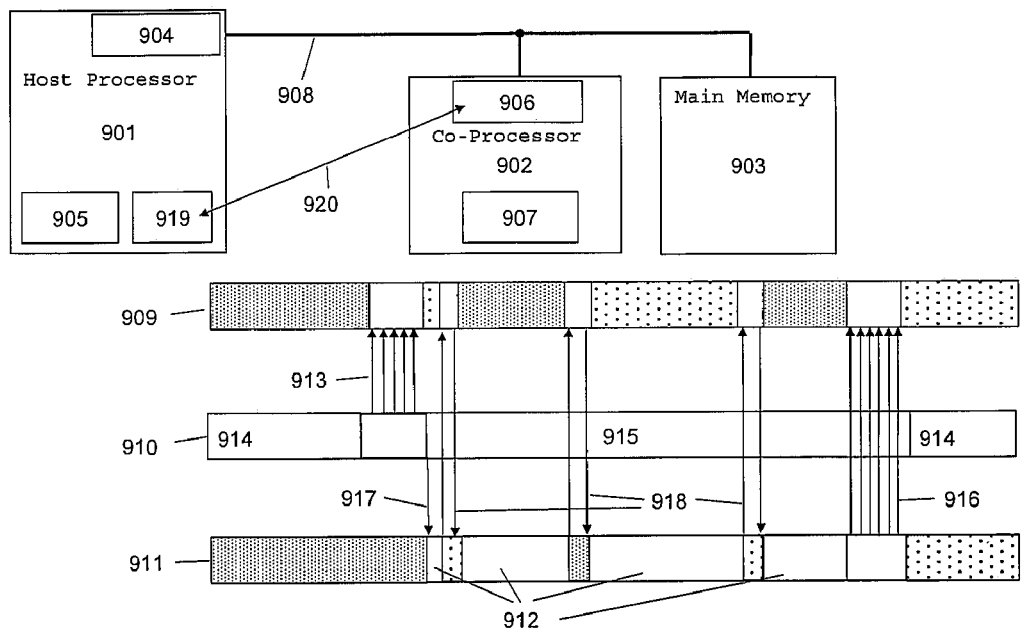
FIG. 9 shows the interactions between the host processor, coprocessor and memory in the context of the host processor running autonomously while the coprocessor is active.

An example configuration is shown in FIG. 9. A host processor 901 contains a bus interface unit 904 that interfaces to the system bus 908. The main memory 903 is connected to the system bus. The host processor also contains a cache 905 and a Translation Lookaside Buffer (TLB) 919. This contains a cache of translations between virtual addresses and physical addresses in the memory system. A coprocessor 902 is connected to the host processor via a bus interface unit 906. The coprocessor also contains a write back cache 904.

The memory address translations must be coherent 920 between the host processor and a TLB held by the coprocessor in the bus interface unit 906. This TLB is used for mapping virtual to physical addresses before initiating a memory transaction with the main memory 903.

A shared virtual memory system also requires management of the entries within the TLB. In this configuration it is assumed that the host processor is running an operating system that determines when to page in and page out particular blocks of virtual memory in the physical address space. Whenever there is a miss in the TLB of a coprocessor an interrupt to the host processor may be generated. This causes the required virtual page to be looked up in the page tables (bringing the data in from secondary storage if required) and the physical page address transmitted to the coprocessor where it is stored for future usage in the TLB. Moreover, if a physical page is ever reclaimed by the operating system for use by another virtual page then the corresponding entries in all coprocessor TLBs must be evicted. This is done using a broadcast message sent from the host processor. Thus this mechanism requires changes to be made to the memory management handling routines within the kernel of the operating system.

The host processor timeline 910 is shown executing a first thread 914. If this thread encounters a function that should be executed on the coprocessor then any dirty data in the host processor cache is first written back to main memory 913. The coprocessor is then initiated by transferring register state across to it 917. The coprocessor timeline 911 is diverted at that point to start execution 912 of the functions. The host processor initiates another thread 915 that may execute while the first thread is being executed on the coprocessor. Cache misses 918 in the coprocessor initiate direct transactions with the main memory 909. Issues of coherence between the host processor and coprocessor are dealt with by the standard thread synchronisation requirements for shared memory. When the execution of the coprocessor functions is complete any dirty data can be written back to main memory 916 and the host processor is able to proceed with the original thread 914.

It is understood that there are many possible alternative embodiments of the invention. It is recognized that the description contained herein is only one possible embodiment. This should not be taken as a limitation of the scope of the invention. The scope should be defined by the claims and we therefore assert as our invention all that comes within the scope and spirit of those claims.

The invention claimed is:

1. A method of automatically configuring an architecture of a target microprocessor of a first type, comprising the steps of:
    (a) a processor generation tool taking, as an input, executable code for an existing microprocessor of a second type differing from said first type;
    (b) the said executable code implementing a software application requiring enhanced performance over that attainable by direct execution by a microprocessor of the second type;
    (c) the processor generation tool adapting an instruction set of the microprocessor of the first type at design time, such that the microprocessor of the first type is optimized for the execution of the software application implemented by the said executable code
    (d) the processor generation tool outputting a hardware description of a microprocessor of the first type that implements the adapted instruction set which differs from that of the second type;
    (e) a code generation tool outputting executable code implementing the software application for the first type of microprocessor by using executable code implementing the software application for the microprocessor of the second type as input and translating that code output from the code generation tool so that identical program behavior is provided but with enhanced performance enabled by use of the adapted instruction set of the first type; wherein at run time
    (f) the microprocessor of the first type with its adapted instruction set being used as a coprocessor in a system for the microprocessor of the second type;
    (g) a number of individual software functions in the executable code that implements the software application and that has been output from the code generation tool being marked for translation and execution on said coprocessor;
    (h) the said executable code marked for translation and execution on the coprocessor being modified by a tool so that function calls to those functions marked for translation cause an equivalent translated function to be executed on said coprocessor; and
    (i) the modified executable code being executed on the microprocessor of the second type.

2. The method according to claim 1 whereby the coprocessor contains one or more cache memories.

3. The method according to claim 2 whereby the coprocessor and host processor communicate via a system bus or a generic coprocessor interface on the host processor.

4. The method according to claim 3 whereby the host processor services memory access requests from the coprocessor while the coprocessor is operational.

5. The method according to claim 4 whereby the coprocessor is able to flush its caches of all modified data when the end of function execution is reached.

6. The method according to claim 1 whereby an original executable image is automatically modified so that function calls to those translated functions cause an equivalent function to be executed on the coprocessor.

7. The method according to claim 6 whereby a coprocessor initiation involves the transfer of register state from the host processor to the coprocessor.

8. The method according to claim 7 whereby completion of a function on the coprocessor causes the transfer of register state from the coprocessor to the host processor.

9. The method according to claim 7 whereby completion of a function on the coprocessor causes the transfer of memory state from the coprocessor to the host processor.

10. The method according to claim 1 whereby the configured architecture generated is designed to execute parts of the executable with higher performance than can be achieved with a host processor.

11. The method according to claim 10 whereby the higher performance is obtained by the execution of more operations in parallel than is achieved with the host processor.

12. The method according to claim 1 whereby the architecture generated is designed to execute parts of the executable with lower power consumption than can be achieved with a host processor.

13. The method according to claim 1 whereby the executable code is translated into the instruction set of the configured processor.

14. The method according to claim 13 whereby each instruction in an executable image is translated into one or more basic operations.

15. The method according to claim 14 whereby each of these operations may be performed by a particular execution unit that is present in the configured processor.

16. The method according to claim 15 whereby a register file is present as an execution unit in the architecture and explicit operations to read and write the register file is generated as part of the translation.

17. The method according to claim 16 whereby static register analysis may be used to eliminate unnecessary writes of registers.

18. The method according to claim 17 whereby code is subdivided into atomically executed blocks.

19. The method according to claim 18 whereby each atomically executed block reproduces the operations of the corresponding host code.

20. The method according to claim 19 whereby the state of live registers at the end of the atomic block execution is identical to that obtained from execution on the host processor.

21. The method according to claim 19 whereby the state of the memory at the end of the atomic block execution is identical to that obtained from execution on the host processor.

22. The method according to claim 1 whereby breakpoints may be set on the configured architecture.

23. The method according to claim 22 whereby the breakpoints may be specified using the addresses of instructions in the original executable.

24. The method according to claim 23 whereby the nearest preceding instruction for which state can be synchronized on the configured processor is determined when the breakpoint is set.

25. The method according to claim 24 whereby the configured processor contains a mechanism to determine the equivalent target instruction address for a host instruction address.

26. The method according to claim 25 whereby the configured processor contains hardware to cause a breakpoint halt on the required address that prevents any side effects caused by sequentially later instructions.

27. The method according to claim 26 whereby upon detection of a breakpoint execution can be continued on the host processor from the synchronized address until the point of the actual breakpoint.

28. The method according to claim 23 whereby the breakpoint address is determined by decoding the data stream on the debug interface to the host processor.

29. The method according to claim 1 whereby certain host processor instruction addresses may be converted to target processor addresses while the system is running.

30. The method according to claim 29 whereby a hashing table is maintained in memory to perform a mapping of certain host processor instruction addresses to target addresses.

31. The method according to claim 30 whereby mapping information may be interleaved with the machine code for the target processor.

32. The method according to claim 31 whereby the state of certain bits within each word of a table are used to indicate whether the information represents an address mapping entry or target machine code.

33. The method according to claim 1 whereby function calls in the executable code may be replaced with uses of particular hardware blocks in the configured processor.

34. The method according to claim 33 whereby the input parameters to the software function correspond to the operands supplied to the corresponding hardware unit.

35. The method according to claim 34 whereby the reference parameters and return result from a software function correspond to the results generated by the corresponding hardware unit.

36. The method according to claim 33 whereby the original software implementation may be used as a behavioral model for hardware for the purposes of simulation.

37. The method according to claim 1 whereby an instruction set translator converts instructions from an executable image into behaviorally equivalent operations that are mapped to a target processor.

38. The method according to claim 3 whereby a copy of some virtual to physical page mappings are maintained by the coprocessor.

39. A first microprocessor automatically configured by a processor generation tool, in which the first microprocessor using the method as defined in claim 1, stores, and operates using, an instruction set adapted, in dependence on the requirements of executable code of a second existing microprocessor of a type differing from that of said the first microprocessor, by the processor generation tool.

* * * * *